United States Patent
Qi et al.

(10) Patent No.: US 8,233,495 B2
(45) Date of Patent: Jul. 31, 2012

(54) DISCOVERY CHANNEL AND DISCOVERY BEACON FOR PEER-TO-PEER DEVICES IN WIRELESS COMMUNICATIONS NETWORK

(75) Inventors: Emily H. Qi, Portland, OR (US); Marc Meylemans, Beaverton, OR (US); Oren Kaidar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 12/386,761

(22) Filed: Apr. 22, 2009

(65) Prior Publication Data

US 2010/0271959 A1    Oct. 28, 2010

(51) Int. Cl.
*H04L 12/28* (2006.01)
(52) U.S. Cl. .................. 370/431; 370/338; 370/401
(58) Field of Classification Search .................. None
See application file for complete search history.

(56) References Cited

U.S. PATENT DOCUMENTS

| | | | |
|---|---|---|---|
| 2003/0137970 A1* | 7/2003 | Odman | 370/350 |
| 2004/0264413 A1 | 12/2004 | Kaidar et al. | |
| 2004/0266430 A1 | 12/2004 | Fudim et al. | |
| 2005/0070279 A1 | 3/2005 | Ginzburg et al. | |
| 2007/0159301 A1* | 7/2007 | Hirt et al. | 340/10.1 |
| 2007/0189249 A1* | 8/2007 | Gurevich et al. | 370/338 |
| 2008/0232389 A1* | 9/2008 | Wu et al. | 370/436 |
| 2009/0103506 A1* | 4/2009 | Bahl et al. | 370/338 |
| 2010/0177712 A1* | 7/2010 | Kneckt et al. | 370/329 |

* cited by examiner

*Primary Examiner* — Bob Phunkulh
*Assistant Examiner* — Jenkey Van
(74) *Attorney, Agent, or Firm* — Schwabe, Williamson & Wyatt, P.C.

(57) ABSTRACT

In a multi-channel wireless communications environment, at least one of the channels may be used for the purpose of allowing devices to discover each other so that they may subsequently communicate with each other on another channel. In some embodiments a special discovery beacon may be used on that channel, which is dedicated to the purpose of allowing the devices to discover each other.

25 Claims, 4 Drawing Sheets

| Channel | Designation |
|---|---|
| 1 | Non-Social |
| 2 | Non-Social |
| 3 | Non-Social |

· · ·   Non-Social
· · ·

| 21 | Non-Social |
|---|---|
| 22 | Social |
| 23 | Social |
| 24 | Social |

FIG. 1

| Field Names | Length (Octets) | Descriptions |
|---|---|---|
| Category | 1 | The Category field is set to the value indicating the Public category |
| Action | 1 | The Action field is set to the value indicating Discovery Beacon |
| Discovery Beacon Interval | 1 | The Discovery Beacon Interval field is set to the value stating how frequent the Discovery Beacons are transmitted. |
| Country String | 2 | The Country String field is set to the first two octets of the value contained in the Country String. |
| Operating Regulatory Class | 1 | The Operating Regulatory Class field indicates the regulatory class value for the operating channel. If the device doesn't operate in any channel other than the Social Channel, the field is set to 0. |
| Operating Channel Number | 1 | The Operating Channel Number indicates the operating channel. If the device doesn't operate in any channel other than the Social Channel, the field is set to 0. |
| P2P Capability field | 1 | The P2P Capability field Indicates capabilities of the P2P device. |
| P2P Discovery field | 1 | See the format of the P2P Discovery field below. |

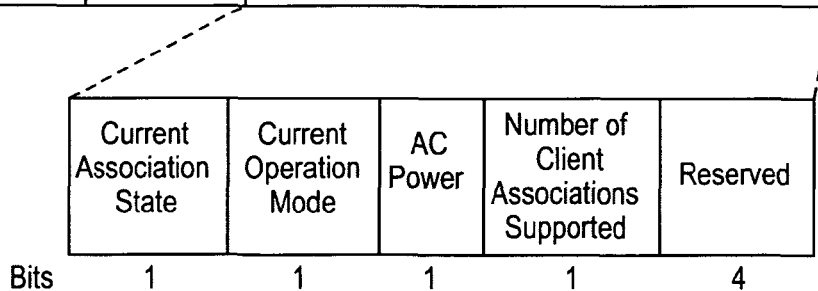

| | Current Association State | Current Operation Mode | AC Power | Number of Client Associations Supported | Reserved |
|---|---|---|---|---|---|
| Bits | 1 | 1 | 1 | 1 | 4 |

FIG. 4

DISCOVERY CHANNEL AND DISCOVERY BEACON FOR PEER-TO-PEER DEVICES IN WIRELESS COMMUNICATIONS NETWORK

BACKGROUND

Most wireless communications networks operate in a centralized control manner, in which the various devices communicate directly only with a network controller, which schedules and regulates those communications. However, peer-to-peer (P2P) operations are being developed in which devices may communicate directly with each other, without routing their messages through a pre-existing network controller. It may be difficult for P2P devices to find each other without a network controller to identify them to each other. One of the P2P devices has to be transmitting a beacon, while the other needs to be listening for a beacon at the same time. If there are multiple channels available to each device (e.g., 24 channels), it may take a long time for two devices to both be in the correct transmit/receive status, and be on the same channel, at the same time.

BRIEF DESCRIPTION OF THE DRAWINGS

Some embodiments of the invention may be understood by referring to the following description and accompanying drawings that are used to illustrate embodiments of the invention. In the drawings:

FIG. 1 shows a listing of channels in a multi-channel communications environment, according to an embodiment of the invention.

FIG. 4 shows the contents of an information element (IE) in a discovery beacon that is different than that in an operational beacon, according to an embodiment of the invention.

DETAILED DESCRIPTION

Figure 2:
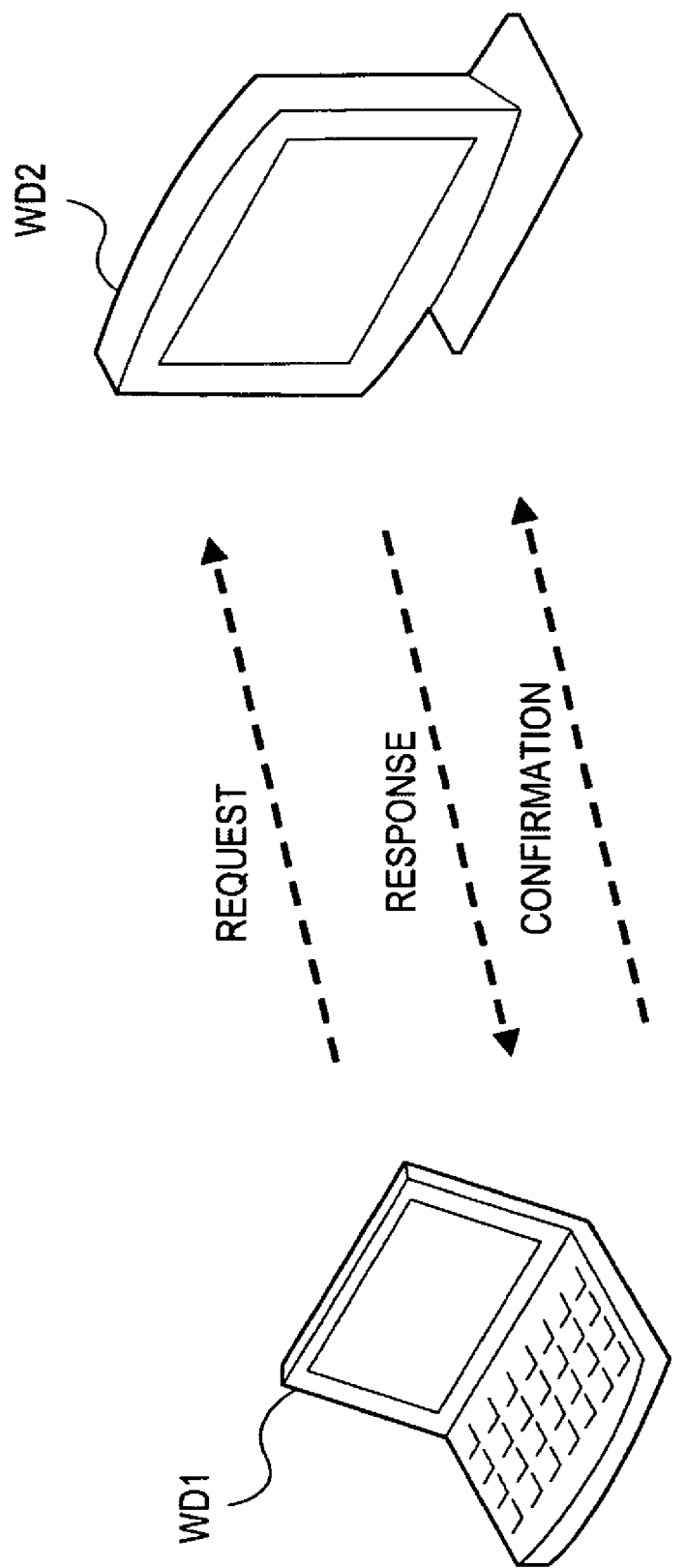
FIG. 2 shows two peer devices discovering each other, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. A wireless device may comprise at least one radio and at least one processor, where the radio transmits signals representing data and receives signals representing data, while the processor may process the data to be transmitted and the data that has been received. The processor may also process other data that is neither transmitted nor received.

The term "wireless device" (WD) is used herein to describe a wireless communications device that has the capability to communicate wirelessly with at least one other wireless device. The terms "associated", "association", and their derivatives each indicate that two wireless devices have provided sufficient information about themselves to each other that each is aware of the other's existence, and they have agreed on enough communication protocols that they can communicate wirelessly with each other.

The term "group owner" is used herein to describe a WD that has established an association with another WD and that schedules communications with that other WD. Various other terms may also be used to describe group owners, such as but not limited to "access point" (AP), "base station" (BS), "control point" (CP), "network controller", etc. The term "group owner" as used in this document is intended to encompass all such alternative labels for this functional device.

The term "client device" is used to describe a WD that has established an association with another WD, when that other WD is the group owner. Various other terms may also be used to describe a client device, such as but not limited to "STA", "subscriber station" (SS), "mobile station" (MS), "DEV", etc. The term "client" is intended to encompass all such alternative labels for these functional devices.

The term "peer device" is used herein to describe a wireless communications device that has not yet been designated as a group owner or a client, but which may subsequently be designated as one or the other when it becomes associated with another peer device.

The term "social channel" is used herein to described a wireless communications channel, within a multi-channel environment, which has been designated specifically for use in allowing multiple wireless devices to locate and identify each other (device discovery) for the purpose of subsequently communicating with each other on a different channel. A non-social channel is any of the multiple channels that is not designated as a social channel, and may not be used for such device discovery. In some embodiments more than one of the multiple channels may be designated as social channels. In some embodiments the social channel(s) may also be used for other communications. A request to associate with a device may be transmitted in the form of a 'discovery' beacon, meaning that the purpose of the beacon is to locate and identify other devices on the social channel for the purpose of association. In some embodiments the discovery beacon may have the same format as a standard operational beacon (the beacon used for normal communications on a non-social channel after association). In other embodiments the discovery beacon may have different format than the operational beacon, and may be used on the social channel(s) only for device discovery, while the operational beacon may be used for other purposes.

In some embodiments, when a discovery beacon is received by a peer device from another peer device, the receiving peer device may then transmit a response accepting the invitation to associate. The request and response may include information used to determine which of the two peer devices will have the group owner role in the subsequent association. A confirmation may be transmitted by the peer device that received the response, to acknowledge acceptance of the response and to confirm which device will be the group owner. In some embodiments the group owner may also accept other devices into the group to form a larger network.

FIG. 1 shows a listing of channels in a multi-channel communications environment, according to an embodiment of the invention. In the illustrated embodiment, there are 24 channels that are available for communicating between wireless devices, but any feasible number of channels may be used. In a conventional network, all of these channels might be used in an identical manner, with device discovery able to take place on any channel. But in the illustrated embodiment only three of the channels, designated as social channels 22, 23, and 24, may be used for device discovery, while the other channels are designated as non-social channels that may not be used for device discovery. In this example, a device searching for another device to associate with would only have to search on the three social channels, knowing that device discovery would not be permitted on the other twenty-one channels. This could greatly reduce the time it takes for two devices to discover each other, when compared with allowing all twenty-four channels to be used for device discovery. Although three social channels are shown in the example, in other embodiments one, two, four, or more than four channels could be designated as social channels.

FIG. 2 shows two peer devices discovering each other, according to an embodiment of the invention. Each device may comprise at least one processor, at least one memory, at least one radio, and at least one antenna for communicating wirelessly. The illustrated embodiment shows device WD1 as a notebook computer and device WD2 as a stand-alone display, but any feasible types of devices with wireless communications capability may be used. In the example, device WD1 may transmit a request, in the form of a beacon, on a social channel. This beacon may include various types of information, such as but not limited to: 1) identification of the requesting device, 2) capabilities of the requesting device, 3) the type of protocols to be used in subsequent communications, 4) etc. In some embodiments this beacon may be broadcast at regular intervals.

If device WD2 receives one of these beacons, and determines that it would be beneficial to associate itself with WD1, then WD2 may transmit a response back to WD1. This response may also include various types of information, such as but not limited to: 1) identification of the responding device, 2) capabilities of the responding device, 3) acceptance of the protocols indicated in the request, or suggestion of alternate protocols, 4) etc. When WD1 receives this response, it may then transmit a confirmation back to WD2, confirming the association of the two devices for subsequent communications. The confirmation may include various types of information, such as but not limited to: 1) a repeat of some of the information contained in the previous response and/or request, 2) indication of which of the two devices will act as a group owner in the subsequent communications, 3) a channel number to switch to for those subsequent communications, 4) etc.

Determining which device will be the group owner may be based on various considerations. In one embodiment, the requesting device will automatically become the group owner. In other embodiments, a negotiation process based on various parameters for the two devices may determine which device will become the group owner. Such parameters may include things such as but not limited to 1) relative capabilities of each device, 2) relative communications and/or processing burden on each device, 3) relative operational power available to each device, 4) etc. In some embodiments, each device may first convert its various parameters into a single parameter that provides an overall relative indication of the device's ability to operate as a group owner. Regardless of whether a single parameter or multiple parameters are used for comparison of this ability, the parameter(s) should be included in the response so that WD1 can compare its ability with that of WD2 and make a decision about which device will be the group owner. In some embodiments the parameter(s) may be included in the request, so that WD2 can compare its ability with that of WD1 and make a suggestion about which device will be the group owner.

Figure 3:
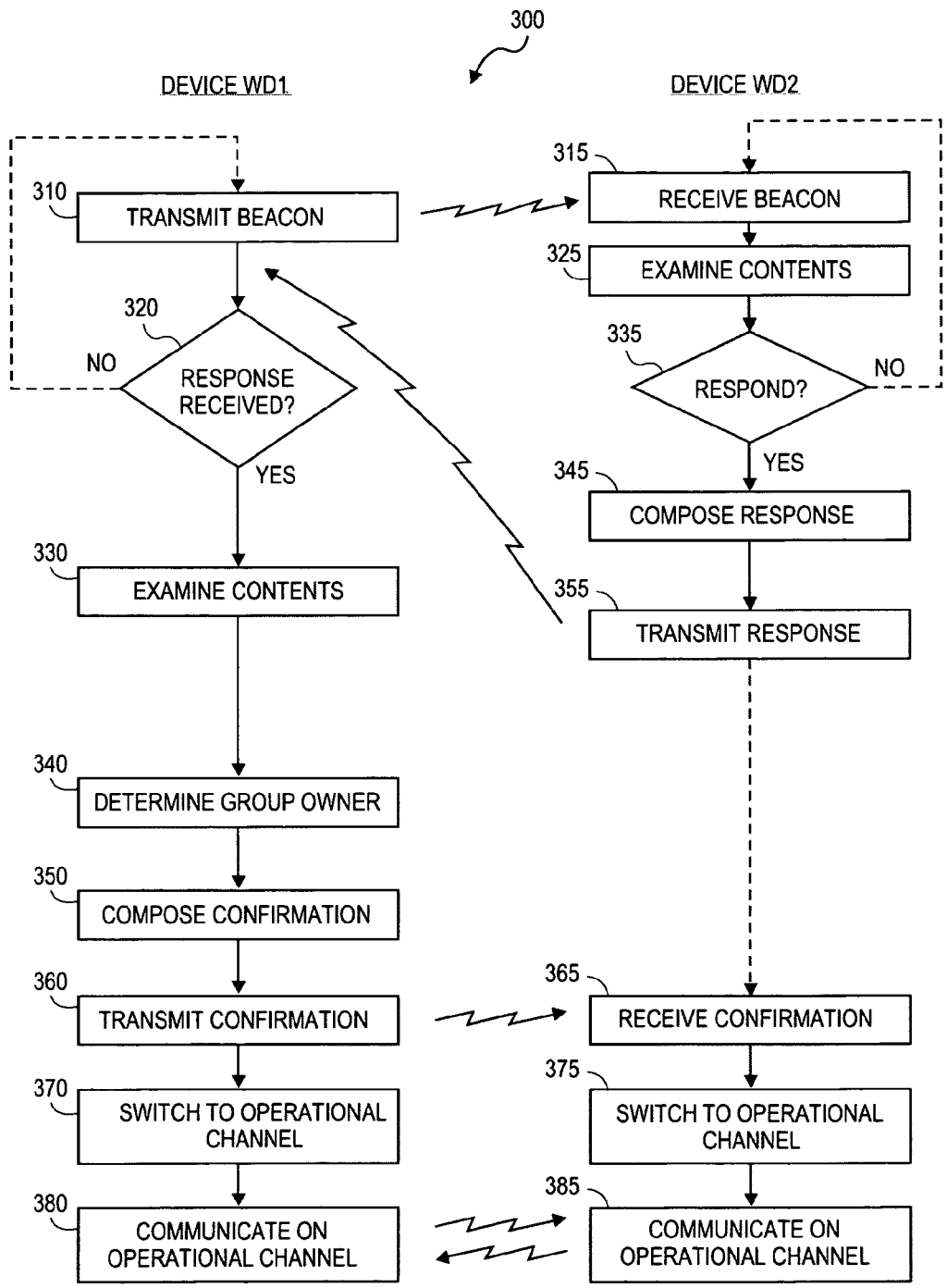
FIG. 3 shows a flow diagram of a discovery process, according to an embodiment of the invention.

FIG. 3 shows a flow diagram of a discovery process, according to an embodiment of the invention. Flow diagram 300 shows a series of operations for two devices, which have been labeled WD1 and WD2 to correspond with the devices shown in FIG. 2, but this diagram may also be applied to any two feasible devices. In the illustrated embodiment, at 310 WD1 transmits a beacon on a social channel, the beacon acting as an open request to other devices to associate with WD1. If no response is received, as determined at 320, WD1 may wait for a prescribed period of time before transmitting another beacon at 310. In some embodiments, WD1 may transmit a beacon on a social channel at regular intervals regardless of whether a response is received.

When WD2 receives the beacon at 315, it examines the contents at 325 to determine whether to respond. A device might choose not to respond for various reasons, such as but not limited to: 1) the device's capabilities are not compatible with the capabilities advertised in the beacon, 2) the beacon signal is so weak that successful communication with the other device is unlikely, 3) the device is already associated with another device and does not have the ability and/or capacity and/or incentive to associate with two devices, 4) etc. If WD2 does not respond, it may continue listening for other beacons.

If WD2 decides to respond to the beacon, it may compose that response at 345 and transmit the response to WD1 at 355. The contents of the response may serve multiple purposes, such as but not limited to: 1) providing information about WD2 that will be needed for operational communications, including information that will be needed to determine which device will become the group owner, 2) agreeing to certain operational parameters specified in the beacon, 3) suggesting alternate values for some of the operational parameters specified in the beacon, 4) etc.

WD1 receives the response at 320, it may examine the contents of that response at 330 and make certain determinations about the subsequent operational communications. For example, WD1 may decide at 340 whether WD1 or WD2 will be the group owner in those operational communications. WD1 may compose a confirmation at 350 for transmission back to WD2. The confirmation may contain various information, including the operational channel that both devices will switch to for the subsequent operational communications, and a statement of the parameters that the devices will use for such operation communications. By using the request/response/confirmation process, both devices are able learn about the other device's capabilities, negotiate certain operational parameters, and determine the final parameters that will be used when operational communications begin.

At 360 WD1 transmits the confirmation to WD2, which receives the confirmation at 365. At that point, both devices may switch to the operational channel at 370, 375 to begin operational communications with each other at 380, 385. Once the two devices have discovered each other and have exchanged information, they may switch to the operational channel and then associate.

In some embodiments, the process described above may be terminated before it completes (not shown). For example, the process may be terminated when WD2 does not receive the confirmation, either because it wasn't transmitted or because it was transmitted but never successfully received. Alternately, the process may be terminated by an express termination contained in either the response or the confirmation. This may happen, for example, because the capabilities of the two devices are not compatible.

As previously described, in some embodiments the discovery beacon used on the social channel for association may have a different format that the operational beacon used for operational communications after that association takes place. FIG. 4 shows a format for an information element (IE) in a discovery beacon that is different than that in an operational beacon, according to an embodiment of the invention. Other embodiments may differ from that shown. The illustrated embodiment contains eight fields, with seven of the fields being one octet (8 bits) in size.

The Category and Action fields may serve their usual purposes, such as identifying the type of frame (e.g., a Public Action Frame) and/or the type of IE. The Discovery Beacon Interval field may be used to specify how long it will be between discovery beacons. The Country String field may indicate which country's rules are to be followed. The Operating Regulatory Class field may be used to indicate the regulatory class for the operating channel, while the Operating Channel Number may be used to indicate which channel the devices should switch to for communicating after the discovery sequence. The P2P Capability field may be used to indicate the capabilities of the transmitting device. The contents of this field may be used, among other things, for determining which device will become the Group Owner as previously described. The P2P Discovery field may provide information that is helpful in the discovery process. One example of the contents of this field is shown, with Current Association Status (already associated or not), Current Operating Mode, AC Power status (battery or AC powered), and the Number of Client Associations the device can support. Other embodiments may differ.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising:
a first wireless device (WD1) including a processor and a radio able to communicate wirelessly over multiple wireless channels of a wireless local area network (WLAN) including a social channel designated for peer-to-peer device discovery and a non-social channel on which device discovery is not permitted;
wherein WD1 is to perform a first communications sequence on the social channel to discover a second wireless device (WD2) that is a peer to the WD1, and is to perform a second communications sequence with WD2 on the non-social channel to form an association; and
wherein WD1 is to transmit a discovery beacon during the first communications sequence, the discovery beacon including an operating channel number indicating an identity of the non-social channel on which the second communications sequence is to be performed, a capability field indicating capabilities of WD1, and a discovery field indicating a current status of WD1.

2. The apparatus of claim 1, wherein the first communications sequence is to comprise:
a request for device association;
a response to the request, and
a confirmation to the response.

3. The apparatus of claim 2, wherein the discovery beacon has a same format as an operational beacon.

4. The apparatus of claim 2, wherein the discovery beacon has a different format than an operational beacon.

5. The apparatus of claim 2, wherein the response is to include information to determine whether WD1 or WD2 will be a group owner during the second communications sequence.

6. The apparatus of claim 5, wherein the group owner is to transmit an operational beacon during the second communications sequence.

7. The apparatus of claim 2, wherein WD1 is to transmit the request and the confirmation and is to receive the response.

8. The apparatus of claim 2, wherein WD2 is to receive the request and the confirmation and is to transmit the response.

9. The apparatus of claim 1, wherein WD 1 comprises at least one antenna.

10. A method, comprising:
performing, by a first wireless device (WD1), a first communications sequence on a social channel designated for device discovery to discover a second wireless device (WD2); and
performing, by WD 1, a second communications sequence with WD2 on a nonsocial channel, on which device discovery is not permitted, to form an association;
wherein WD1 is to transmit a discovery beacon during the first communications sequence, the discovery beacon including an operating channel number indicating an identity of the non-social channel on which the second communications sequence is to be performed, a capability field indicating capabilities of WD1, and a discovery field indicating a current status of WD1.

11. The method of claim 10, wherein the first communications sequence comprises:
a request for device association;
a response to the request, and
a confirmation to the response.

12. The method of claim 11, wherein the discovery beacon has a same format as an operational beacon.

13. The method of claim 11, wherein discovery beacon has a different format than an operational beacon.

14. The method of claim 11, wherein the response includes information to determine whether WD1 or WD2 will be a group owner during the second communications sequence.

15. The method of claim 14, wherein the group owner transmits an operational beacon during the second communications sequence.

16. The method of claim 11, wherein WD1 transmits the request and the confirmation and receives the response.

17. The method of claim 11, wherein WD2 receives the request and the confirmation and transmits the response.

18. An article comprising:
a tangible non-transitory computer-readable medium that contains instructions, which when executed by one or more processors result in performing operations comprising:
performing, by a first wireless device (WD1), a first communications sequence with a second wireless device (WD2) on a social channel designated for device discovery to discover WD2; and
performing, by WD1, a second communications sequence with WD2 on a non-social channel, on which device discovery is not permitted, to form an association;
wherein WD1 is to transmit a discovery beacon during the first communications sequence, the discovery beacon including an operating channel number indicating an identity of the non-social channel on which the second communications sequence is to be performed, a capability field indicating capabilities of WD1, and a discovery field indicating a current status of WD1.

19. The article of claim 18, wherein the first communications sequence comprises:
a request for device association;
a response to the request, and
a confirmation to the response.

20. The article of claim 19, wherein the discovery beacon has a same format as an operational beacon.

21. The article of claim 19, wherein the discovery beacon has a different format than an operational beacon.

22. The article of claim 19, wherein the response includes information to determine whether WD1 or WD2 will be a group owner during the second communications sequence.

23. The article of claim 22, wherein the group owner transmits an operational beacon during the second communications sequence.

24. The article of claim 19, wherein WD1 transmits the request and the confirmation and receives the response.

25. The article of claim 19, wherein WD2 receives the request and the confirmation and transmits the response.

* * * * *